United States Patent
Amler et al.

(10) Patent No.: US 12,468,735 B2
(45) Date of Patent: *Nov. 11, 2025

(54) PARTITION-LOCAL PARTITION VALUE IDENTIFIER GROUPING

(71) Applicant: SAP SE, Walldorf (DE)

(72) Inventors: Andreas Amler, Heidelberg (DE); Jonathan Dees, Karlsruhe (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,898

(22) Filed: Nov. 21, 2023

(65) Prior Publication Data

US 2024/0086426 A1    Mar. 14, 2024

Related U.S. Application Data

(63) Continuation of application No. 17/745,741, filed on May 16, 2022, now Pat. No. 11,860,906.

(51) Int. Cl.
    *G06F 16/00*      (2019.01)
    *G06F 16/27*      (2019.01)
    *G06F 16/28*      (2019.01)

(52) U.S. Cl.
    CPC .......... *G06F 16/285* (2019.01); *G06F 16/278* (2019.01)

(58) Field of Classification Search
None
See application file for complete search history.

(56) References Cited

U.S. PATENT DOCUMENTS

| | | | |
|---|---|---|---|
| 2009/0094236 A1* | 4/2009 | Renkes | G06F 16/2272 |
| 2015/0142819 A1* | 5/2015 | Florendo | G06F 16/22 |
| | | | 707/741 |
| 2015/0186433 A1* | 7/2015 | Sharique | G06F 16/278 |
| | | | 707/736 |

* cited by examiner

*Primary Examiner* — Anhtai V Tran
(74) *Attorney, Agent, or Firm* — Mintz Levin Cohn Ferris Glovsky and Popeo, P.C.

(57) ABSTRACT

A method for executing a query may include generating a partition value identifier for a partitioned table. The partitioned table may include a main fragment including a main dictionary storing a first value and a main value identifier corresponding to the first value and a delta fragment including a delta dictionary storing a second value and a delta value identifier corresponding to the second value. The partition value identifier may be set based at least in part on the first value and the second value. The generated partition value identifier and a corresponding one of the main value identifier and the delta value identified may be maintained as part of a mapping. A query to group data stored in the partitioned table may be received. The query may be executed by at least using the mapping.

17 Claims, 5 Drawing Sheets

PARTITION-LOCAL PARTITION VALUE IDENTIFIER GROUPING

CROSS REFERENCE TO RELATED APPLICATIONS

This application is a continuation of application Ser. No. 17/745,741 filed May 16, 2022, entitled "PARTITION-LOCAL PARTITION VALUE IDENTIFIER GROUPING." The disclosure of which is incorporated herein by reference in its entirety.

TECHNICAL FIELD

The subject matter described herein relates generally to database processing and more specifically to partition-local partition value identifier (PartValueId) grouping.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for partition-local partition value identifier (PartValueId) grouping. In one aspect, there is provided a system. The system may include at least one data processor and at least one memory. The at least one memory may store instructions that result in operations when executed by the at least one data processor. The operations may include: generating a partition value identifier for a partitioned table including: a main fragment including a main dictionary storing a first mapping between a first value and a main value identifier corresponding to the first value and a delta fragment including a delta dictionary storing a second mapping between a second value and a delta value identifier corresponding to the second value. The delta value identifier is different from the main value identifier. Generating the partition value identifier includes: setting the partition value identifier based at least in part on the first value and the second value. The operations may include maintaining a mapping between the generated partition value identifier and a corresponding one of the main value identifier and the delta value identifier. The operations may include receiving a query including a request to group data stored in the partitioned table across the main fragment and the delta fragment. The operations may include executing the query by at least using the mapping.

In some variations, generating the partition value identifier further includes at least one of: setting the main value identifier as the partition value identifier based on a determination that the first value is the same as the second value or the first value is stored only in the main fragment and setting the partition value identifier as a summation of a size of the main dictionary and an additional value based on a determination that the second value is stored only on the delta fragment.

In some variations, the additional value is the delta value identifier corresponding to the second value.

In some variations, the size of the main dictionary is a maximum quantity of the main value identifier stored in the main dictionary.

In some variations, the partitioned table includes a single partition.

In some variations, the operations further include: combining the delta fragment and the main fragment during a delta merge and resetting, based on the delta merge, the partition value identifier.

In some variations, the query is further executed by at least using a source of the first value or the second value associated with the corresponding one of the main value identifier and the delta value identifier.

In some variations, the source is the corresponding one of the main fragment or the delta fragment.

A computer-implemented method may include generating a partition value identifier for a partitioned table including: a main fragment including a main dictionary storing a first mapping between a first value and a main value identifier corresponding to the first value and a delta fragment including a delta dictionary storing a second mapping between a second value and a delta value identifier corresponding to the second value. The delta value identifier is different from the main value identifier. Generating the partition value identifier includes: setting the partition value identifier based at least in part on the first value and the second value. The method may include maintaining a mapping between the generated partition value identifier and a corresponding one of the main value identifier and the delta value identifier. The method may include receiving a query including a request to group data stored in the partitioned table across the main fragment and the delta fragment. The method may include executing the query by at least using the mapping.

A non-transitory computer-readable medium storing instructions, which when executed by at least one data processor, may result in operations including: generating a partition value identifier for a partitioned table including: a main fragment including a main dictionary storing a first mapping between a first value and a main value identifier corresponding to the first value and a delta fragment including a delta dictionary storing a second mapping between a second value and a delta value identifier corresponding to the second value. The delta value identifier is different from the main value identifier. Generating the partition value identifier includes: setting the partition value identifier based at least in part on the first value and the second value. The operations may include maintaining a mapping between the generated partition value identifier and a corresponding one of the main value identifier and the delta value identifier. The operations may include receiving a query including a request to group data stored in the partitioned table across the main fragment and the delta fragment. The operations may include executing the query by at least using the mapping.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
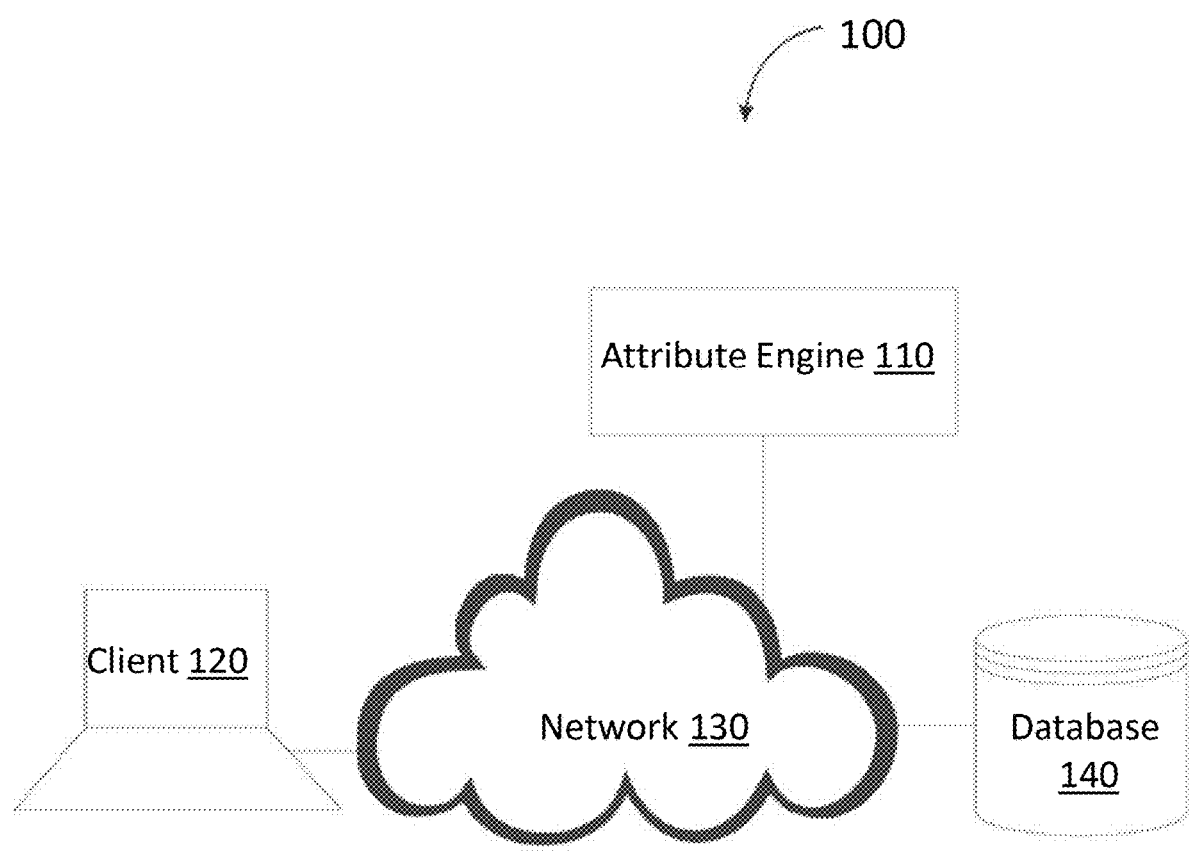
FIG. 1 depicts a system diagram illustrating a query processing system, in accordance with some example embodiments.

A data table can be divided into multiple partitions. Partitioning a table generally becomes necessary when the data stored in the table exceeds a certain size. Partitioning the table can also be used in other situations, such as when a table is distributed over several hosts. Each partition generally has three fragments: a main fragment, a delta1 fragment, and a delta2 fragment. The main fragment may be a read-optimized fragment that holds the majority of the data. The delta1 fragment is a small write-optimized fragment that contains all updates to the data since the last delta merge during which all changes from the delta1 fragment are committed to the main fragment. The delta2 fragment is another small write-optimized fragment that is used to contain updates to the data that were made during an ongoing delta merge. The delta merge operation may create a new main fragment from tuples in the current main fragment and from committed changes in the delta1 fragment. In a production environment, the main fragment is generally much larger than the delta1 fragment and the delta2 fragment.

In a database, such as a column-store database or a column-oriented database, the values in the columns of a table may be compressed using a dictionary or dictionary encoding on each fragment (e.g., the main fragment, the delta1 fragment, the delta2 fragment, etc.). Generally, the dictionaries include columns that store an index value referencing the actual data. The stored index values are value identifiers (also referred to herein as valueIds or VIDs), such as numeric values and/or identifiers that include a numeric value, to map onto the data so it is not necessary to search the data itself, which would be cumbersome and computationally expensive. Instead, a column of the dictionary may be a list of index values (e.g., the VIDs). Each VID in the column represents a position in the dictionary. For example, a VID with a value of "5" points to a sixth value in the corresponding dictionary, since the VIDs begin with the value "0" pointing to a first value in the corresponding dictionary.

In order to avoid having to materialize the data values, a GroupBy operator may use the VIDs for grouping whenever possible and beneficial. The GroupBy operator combines all rows that have the same value (e.g., GroupBy column x groups all columns with x). To execute the GroupBy operator, all values from all rows in each fragment can be compared to determine which rows have the same value and can be grouped.

Since different VIDs from separate fragments on a partition can translate into the same data value, a post-grouping step is generally needed to group the result of the operator by value in each fragment. In this scenario, VID grouping would generally only be beneficial in scenarios where the output is very small compared to the input, making the post-grouping step cheap with respect to computation time. As a worst case scenario, such as if VID grouping does not reduce the input size, in order to group the data values across fragments storing a large amount of data, each of the values would need to be read and compared because different VIDs from separate fragments on a partition can translate into the same data value. This would be impractical and significantly increase computing time and resources. Accordingly, in some instances, VID grouping can reduce the size of the data for searching. But in other instances, it does not, such as when there are many distinct values stored in the fragment. In either case, the decision to group values would need to be made based on limited estimated information and before the data values are known. Thus, grouping the data values may reduce efficiency and increase computing time.

The query processing system consistent with embodiments of the current subject matter provides mapping from fragment-local VIDs to partition-local partition value identifiers (also referred to herein as partition value identifiers, PartVIDs, or PartValueIds) that are maintained by an attribute engine. The partition value identifiers generated by the query processing system may allow for mapping across fragments and eliminates issues that would arise from mismatched VIDs across the fragments in a particular partition. Accordingly, the query processing system described herein may reduce needed computational resources for processing queries and may improve processing speed when executing a query that includes certain query operators, such as GroupBy operators.

FIG. 1 depicts a system diagram illustrating a query processing system 100, in accordance with some example embodiments. Referring to FIG. 1, the query processing system 100 may include an attribute engine 110, a client 120, and a database 140. As shown in FIG. 1, the attribute engine 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like.

As described herein, the attribute engine 110 may process queries received from the client 120, such as requests to group data stored in a partitioned table stored on the database 140, requests that require data stored in the partitioned table to be grouped, or the like. The attribute engine 110 may include at least one processor and/or at least one memory storing instructions for execution by the at least one processor. The attribute engine 110 may generate a partition value identifier (as described in more detail below), maintain the database 140 and data stored thereon, receive and execute queries, and/or the like.

In some example embodiments, the client 120 may be a mobile device including, for example, a smartphone, a tablet computer, a wearable apparatus, and/or the like. However, it should be appreciated that the client 120 may be any processor-based device including, for example, a laptop computer, a workstation, and/or the like. In some implementations, the client 120 includes an application, such as a mobile application, which may be a type of application software configured to run on a mobile device or any processor-based device. Moreover, the application of the client may be a web application configured to provide access, at the client 120, to the attribute engine 110. In some embodiments, the client 120 includes a graphical user interface. The user may interact with the graphical user interface.

Figure 2:
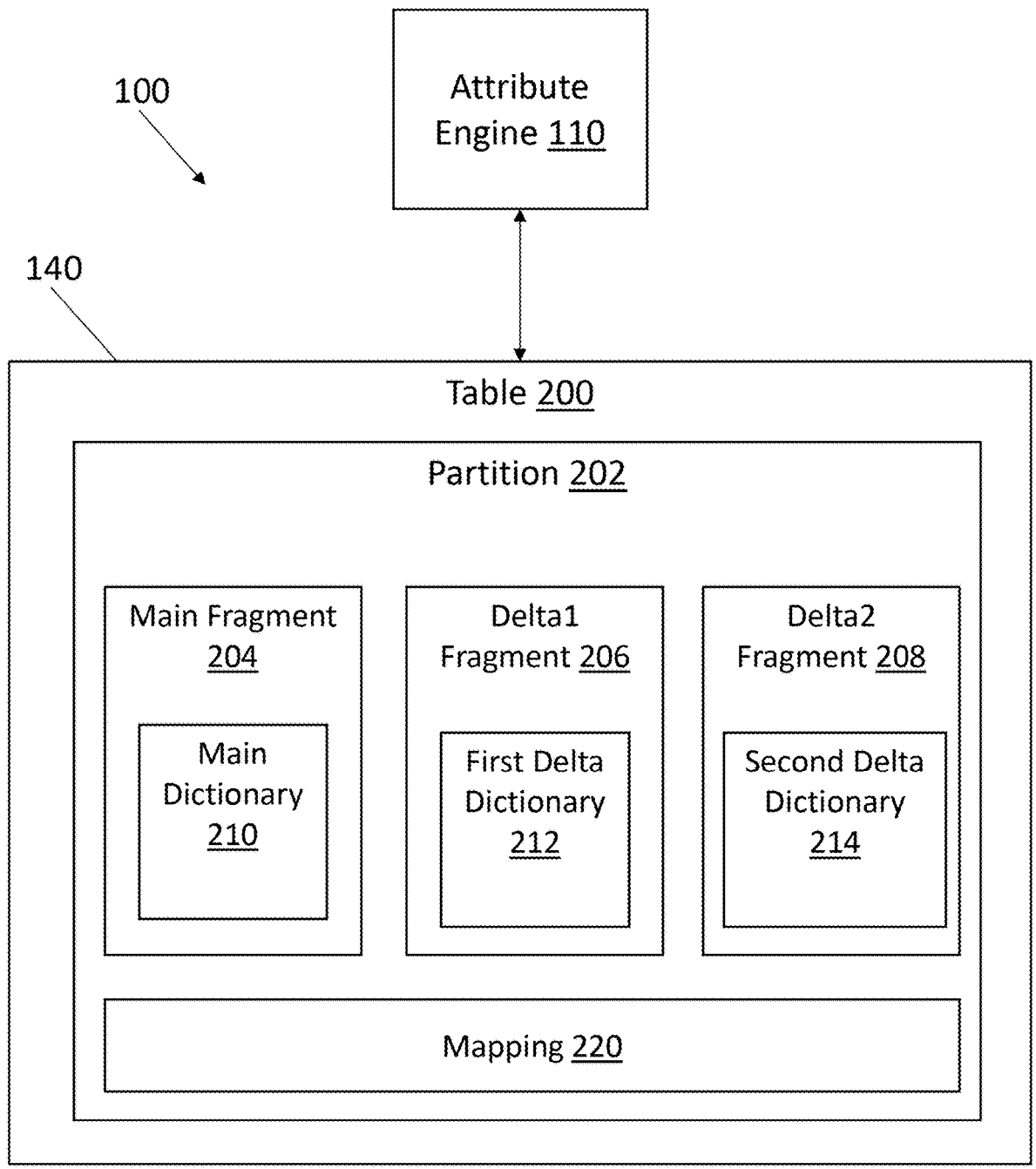
FIG. 2 depicts a block diagram illustrating the query processing system, in accordance with some example embodiments.

The database 140 may be any type of database including, for example, a graph database, an in-memory database, a relational database, a non-relational (NoSQL) database, and/or the like. The database 140 may include one or more (e.g., one, two, three, four, five, or more) databases. To further illustrate, FIG. 2 depicts a block diagram illustrating another example of the query processing system 100, in accordance with some example embodiments. As shown in FIG. 2, a partitioned table 200 may be stored on the database 140. The partitioned table 200 may relate to an attribute. The partitioned table 200 may store data, such as one or more data vectors, string values, and/or the like. The partitioned table 200 may include at least one partition 202, such as a single partition, two partitions, three partitions, four partitions, five partitions, ten partitions, one hundred partitions or the like.

Consistent with embodiments of the current subject matter, the partition 202 (e.g., each partition of the at least one partition 202) may include a plurality of fragments. For example, the partition 202 may include a first fragment, such as a main fragment 204, a second fragment, such as a delta1 fragment 206, and/or a third fragment, such as a delta2 fragment 208. The main fragment 204 may be a read-optimized fragment that holds the majority of the data stored in the partitioned table 200. The delta1 fragment 206 may be a small write-optimized fragment that contains all updates to the data since the last delta merge operation, during which all changes from the delta1 fragment 206 are written to the main fragment 204. The delta2 fragment 208 may include another small write-optimized fragment that is used to contain updates to the data that were made during an ongoing delta merge operation. The delta merge operation may create a new main fragment (not shown) from tuples in the current main fragment and including committed changes from the delta1 fragment 206.

The data values stored in each of the main fragment 204, the delta1 fragment 206, and the delta2 fragment 208 may be compressed using a dictionary or dictionary encoding on each fragment. For example, the main fragment 204 may include and/or be communicatively coupled to a main dictionary 210, the delta1 fragment 206 may include and/or be communicatively coupled to a first delta dictionary 212, and the delta2 fragment 208 may include and/or be communicatively coupled to a second delta dictionary 214. The main dictionary 210, the first delta dictionary 212, and the second delta dictionary 214 may encode data values (e.g., data vectors, string values, or the like) of the data stored on each respective fragment as value identifiers and may store the mapping between the value identifiers and the data values. As described herein, the value identifiers indicate a position of the values of the data in the dictionary and generally allow for quickly searching each fragment.

Figure 3:
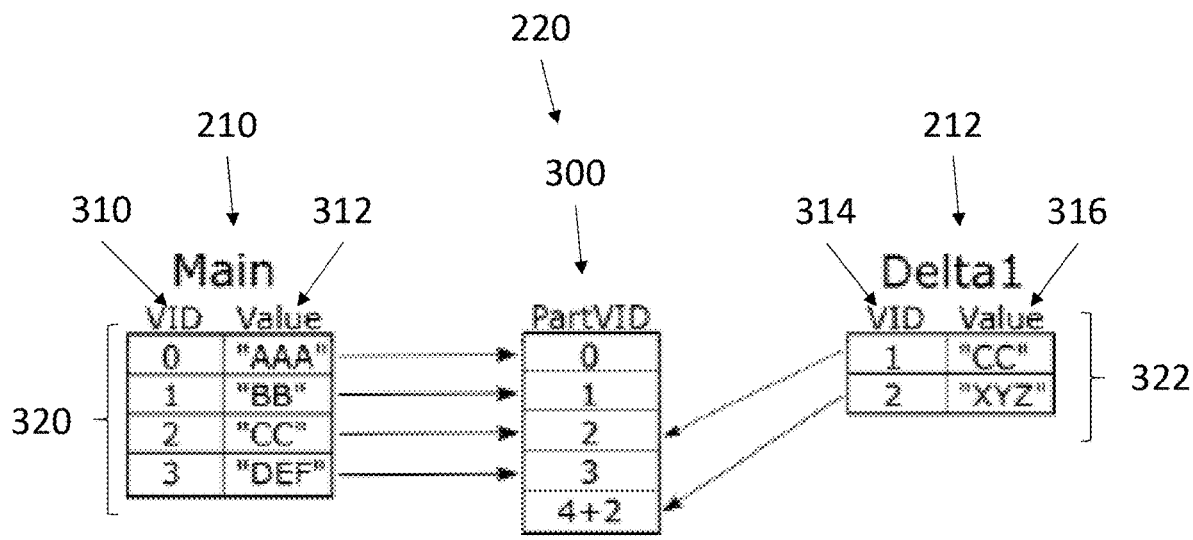
FIG. 3 depicts generating a partition value identifier and a mapping using a main dictionary and a delta dictionary, in accordance with some example embodiments.

FIG. 3 shows an example of the main dictionary 210 and the first delta dictionary 212 according to some example embodiments. As shown in FIG. 3, the main dictionary 210 may include a first column 310 that includes the value identifiers for the main fragment 204 and a second column 312 that includes the encoded data values of the main fragment 204. The main dictionary 210 also includes a plurality of rows 320. The plurality of rows 320 each include the data values and corresponding value identifier. For example, the value "AAA" is encoded using the main dictionary 210 value identifier "0." The other values "BB", "CC", and "DEF" are also encoded using the main dictionary 210.

Again referring to FIG. 3, the first delta dictionary 212 may include a first column 314 that includes the value identifiers for the delta1 fragment 206 and a second column 316 that includes the encoded data values of the delta1 fragment 206. The first delta dictionary 212 also includes a plurality of rows 322. The plurality of rows 322 each include the data values and corresponding value identifier. For example, the value "CC" is encoded using the first delta dictionary 212 value identifier "1." The other value "XYZ" is also encoded using the first delta dictionary 212. It should be appreciated that the main dictionary 210 and the first delta dictionary 212 may include any number of rows. It should also be appreciated that while only the first delta dictionary 212 is shown, the second delta dictionary 214 may be the same as the first delta dictionary 212, but include the same and/or different data values corresponding to each value identifier.

Referring back to FIG. 2, the partition 202 may include a mapping 220. The mapping 220 may store an association between a partition value identifier generated by the attribute engine 110 and at least one value identifier (e.g., a local value identifier) from the main dictionary 210 (e.g., a main value identifier from the main dictionary), the first delta dictionary 212 (e.g., a delta or first delta value identifier from the first delta dictionary), and/or the second delta dictionary 214 (e.g., a delta or a second delta value identifier from the second delta dictionary). The mapping between the fragment-local value identifiers to partition-local partition value identifiers (partVIDs) may additionally or alternatively be generated and/or maintained by the attribute engine 110. The attribute engine 110 may update the mapping 220 at the beginning of a query, prior to processing or execution of the query, and/or after or during a delta merge. For example, after a delta merge, the value identifiers in the main dictionary 210, the first delta dictionary 212, and/or the second delta dictionary 214 may be reset and/or the encoded data values may be updated. As a result, the partition value identifiers may also be reset.

The attribute engine 110 may generate the partition value identifiers. The partition value identifiers may be a numeric value and/or include a numeric value. In some embodiments, the attribute engine 110 generates a partition value identifier for each unique data value stored across the fragments (e.g., the main fragment 204, the delta1 fragment 206, and/or the delta2 fragment 208) and maps the generated partition value identifier to the one or more value identifiers corresponding to each unique data value.

For example, the attribute engine 110 may generate the partition value identifiers based on the encoded data values and/or the value identifiers across fragments (e.g., the main fragment 204, the delta1 fragment 206, and/or the delta2 fragment 208). In some embodiments, the attribute engine 110 assigns or sets the value identifier for a particular encoded value stored in the main fragment 204 as the partition value identifier when the particular encoded value is stored only in the main fragment 204 (e.g., the data value is not stored on any other fragment such as the delta1 fragment 206). Additionally and/or alternatively, the attribute engine 110 assigns or sets the value identifier for a particular encoded value stored in the main fragment 204 as the partition value identifier when the particular encoded data value is the same in the compared fragments (e.g., the main fragment 204 and the delta1 fragment 206 or the delta2 fragment 208) or otherwise is stored in each of the compared fragments.

Additionally and/or alternatively, the attribute engine 110 computes a partition value identifier in other scenarios, such as when a particular encoded data value is stored only on the delta1 fragment 206 or the delta2 fragment 208, rather than on the main fragment 204. In particular, the attribute engine 110 may assign or set the partition value identifier as a summation of a size of the main dictionary 210 and an additional value based on a determination that the particular encoded data value is stored only on the delta1 fragment 206 or the delta2 fragment 208, rather than on the main fragment 204. The size of the main dictionary 210 may be defined as a maximum quantity of the rows 320 of the main dictionary 210, a maximum quantity of the value identifiers stored in the main dictionary 210, and/or the like. In some embodiments, the additional value added to the size of the main dictionary 210 is the value identifier corresponding to the particular encoded data value stored only on the delta1 fragment 206 or the delta2 fragment 208. Accordingly, the partition value identifier can be generated for each of the encoded data values (e.g., unique data values) stored across the main fragment 204, the delta1 fragment 206, and/or the delta2 fragment 208.

As an example, FIG. 3 shows an example of the mapping 220. In the mapping 220, the partition value identifiers 300 that have been generated by the attribute engine 110 based on the main fragment 204 and the first delta dictionary 212 shown in FIG. 3. In this example, the attribute engine 110 set the value identifier "0" from the main dictionary 210 as the partition value identifier "0" because the value "AAA" corresponding to the value identifier "0" is stored only in the main fragment 204. Similarly, the attribute engine 110 set the value identifier "1" from the main dictionary 210 as the partition value identifier "1" because the value "BB" corresponding to the value identifier "1" is stored only in the main fragment 204. The attribute engine 110 also set the value identifier "3" from the main dictionary 210 as the partition value identifier "3" because the value "DEF" corresponding to the value identifier "3" is stored only in the main fragment 204.

As shown in FIG. 3, the attribute engine 110 set the value identifier "2" from the main dictionary 210 as the partition value identifier "2" based on a determination that the value "CC" is the same in both the main fragment 204 and the delta1 fragment 206. Thus, even though the value identifier corresponding to the value "CC" is stored as "1" in the first delta dictionary 212, the partition value identifier associated with the value "CC" is assigned as "2" by the attribute engine 110 to match the value identifier corresponding to the same value "CC" from the main dictionary 210.

Referring again to FIG. 3, the attribute engine 110 determined that the value "XYZ" is stored only on the delta1 fragment 206. As a result, the attribute engine 110 generated the corresponding partition value identifier as a summation of a size of the main dictionary 210 and the value identifier "2" corresponding to the value "XYZ" stored in the first delta dictionary 212. In this example, the size of the main dictionary 210 is 4 because the maximum quantity of the rows 320 and/or the maximum quantity of the value identifiers stored in the main dictionary 210 is 4. Accordingly, the attribute engine 110 set the partition value identifier as "4+2" or "6" as the summation of the size "4" and the corresponding value identifier "2" from the first delta dictionary 212.

Figure 4:
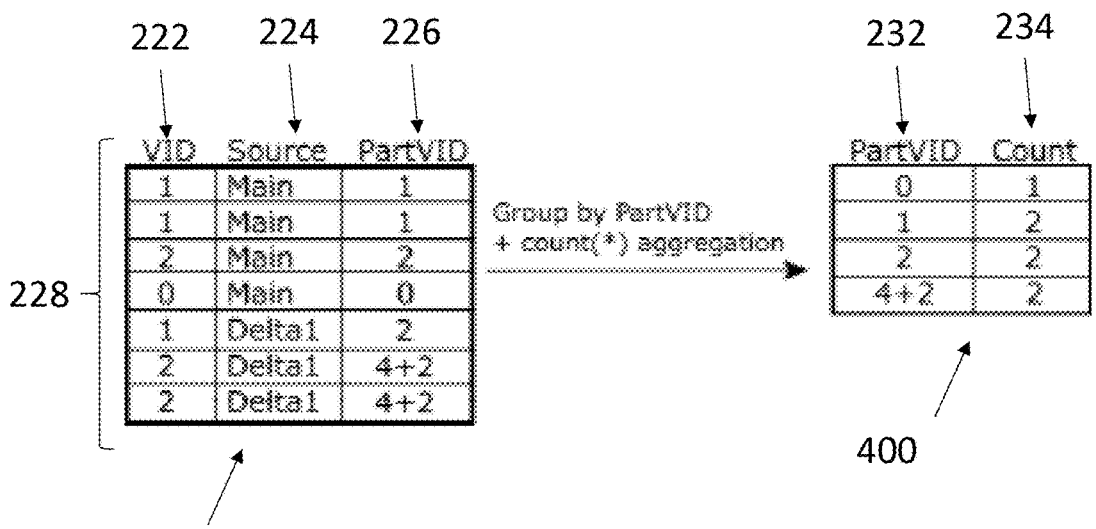
FIG. 4 depicts an input and an output of a query operator, in accordance with some example embodiments.

FIG. 4 illustrates an input to a query operator, such as a GroupBy operator (e.g., a query to group by the partition value identifiers and aggregate a count of the partition value identifiers). As shown in FIG. 4, an input 221 may be provided to the query operator. The input 221 may include the generated partition value identifiers from the mapping 220 and one or more value identifiers that correspond to the generated partition value identifiers. For example, if the generated partition value identifier corresponds to an encoded data value that is stored only on the main fragment 204 or an encoded data value that is stored only on the delta1 fragment 206 or the delta2 fragment 208, the association between the generated partition value and only the value identifier corresponding to that encoded data value would be included in the input 221. However, if the generated partition value identifier corresponds to an encoded data value that is stored on both the main fragment 204 and at least one of the delta1 fragment 206 and the delta2 fragment 208, the association between the generated partition value and all of the value identifiers from each respective dictionary corresponding to the particular encoded data value in each respective fragment would be included in the input 221.

In some embodiments, the input 221 includes the generated partition value identifier in a row of a plurality of rows 228. The row of the input 221 may also include the corresponding value identifier and/or a source of the corresponding value identifier. The source may include the main dictionary 210, the first delta dictionary 212, and/or the second delta dictionary 214 from which the corresponding value identifier was stored. In some embodiments, each row of the input 221 may include the generated partition value identifier and each of the corresponding value identifiers associated with the generated partition value identifier. In this example, each row of the input 221 would include the generated partition value identifier and the associated value identifier from the main dictionary 210 and the associated value identifier from the first delta dictionary 212 or the second delta dictionary.

As described herein, the input 221 includes a plurality of columns and a plurality of rows 228. The plurality of columns includes a value identifier 222 from the main dictionary 210, the first delta dictionary 212, and/or the second delta dictionary 214, a source 224 (e.g., the main dictionary 210, the first delta dictionary 212, and/or the second delta dictionary 214) of the value identifier 222, and the generated partition value identifier 226. As shown in the example input 221, a first row includes the value identifier "1" from the source "Main" or "main dictionary" and the corresponding generated partition value identifier "1". As another example, a third and fifth row of the input 221 both include the partition value identifier "2", but include the associated value identifiers from each of the dictionaries (e.g., value identifier "2" from the "main" source and value identifier "1" from the "delta1" source). This allows for only the partition value identifiers to be searched in a particular partition and across fragments within the partition without needing to read the actual values of the encoded data values in each fragment, significantly improving computing speed, decreasing required computing resources, and improving computing efficiency.

As shown in FIG. 4, an aggregation table 400 may be generated as an output of the query operator. For example, a query may include the following query operator: "GroupBy(PartVID)+count(*) aggregation". In this example, the query includes a request to group by the partition value identifiers and aggregate a count of the partition value identifiers. The aggregation table 400 may be generated based on the input 221 and/or the mapping 220 to include a first column 232 listing the generated partition value identifiers and a second column 234 listing a count. The count may include a total number of input rows containing a particular partition value identifier. As an example, the third row has a count of "2" because two of the input rows in the input 221 include a partition value identifier of "2".

As described herein, a delta merge may occur to commit the changes stored in the delta1 fragment 206 to the main fragment 204. In doing so, the delta fragment and the main fragment would be combined. When the delta merge occurs, the data stored in the main fragment changes and the main fragment becomes a "new" main fragment. The delta2 fragment 208 also takes the place of the delta1 fragment 206. As a result, new value identifiers are assigned to the encoded data values stored in each of the resulting fragments and the new value identifiers are stored in corresponding dictionaries of the resulting fragments. Accordingly, after a delta merge occurs, the attribute engine 110 resets the partition value identifiers stored in the mapping 220 and generates new partition value identifiers. In some embodiments, the attribute engine 110 generates a new mapping 220 to store the newly generated partition value identifiers.

Figure 5:
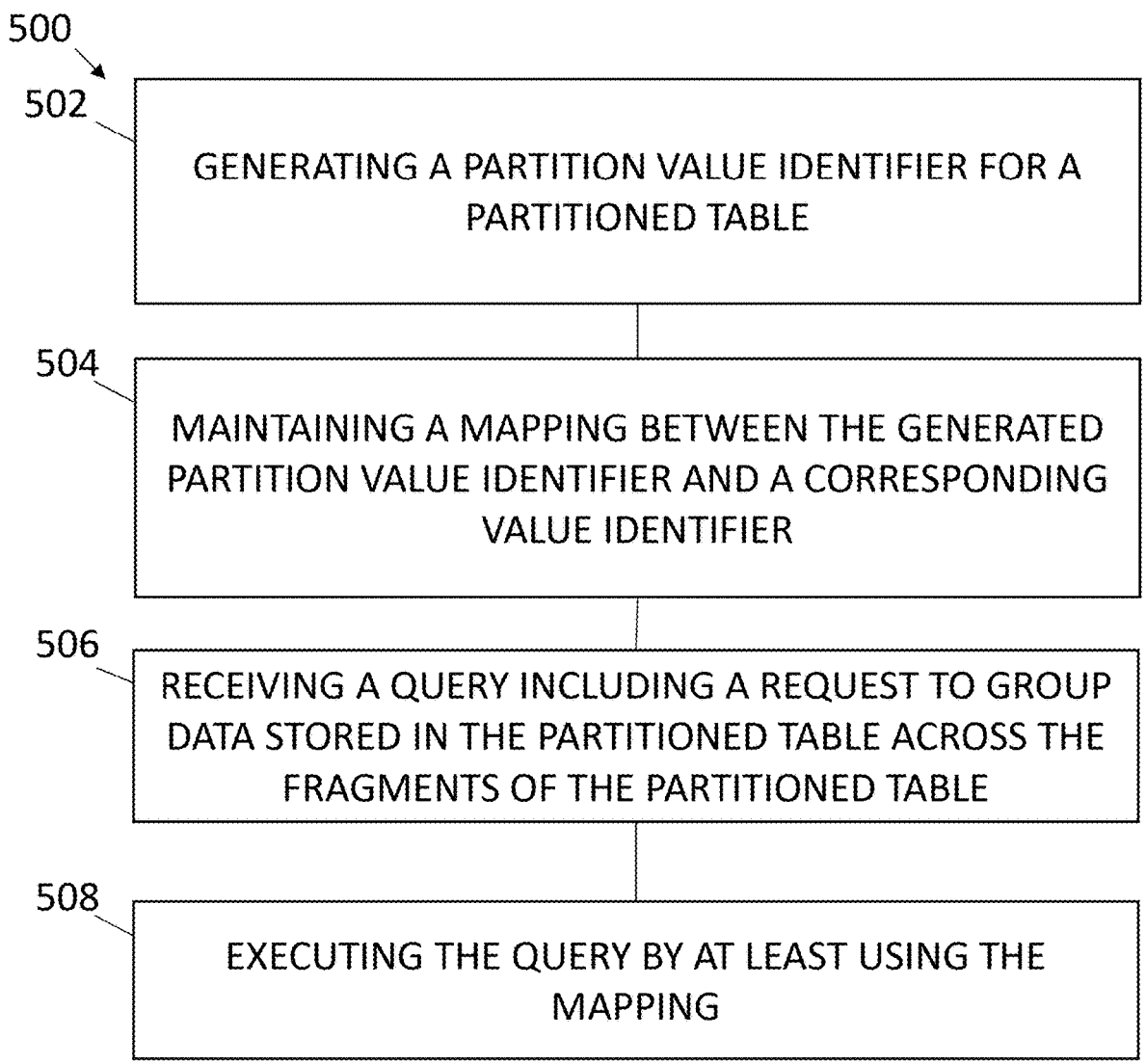
FIG. 5 depicts a flowchart illustrating a process for executing a query using a partition value identifier, in accordance with some example embodiments.

FIG. 5 depicts a flowchart illustrating a process 500 for executing a query using a generated partition value identifier, in accordance with some example embodiments. Referring to FIGS. 1-4, one or more aspects of the process 500 may be performed by the query processing system 100, such as the client 120 and/or the attribute engine 110 and in some embodiments, using the database 140. The query processing system 100 described herein may efficiently and quickly process queries, such as GroupBy operators. For example, the query processing system 100 may process queries without pre-grouping and/or post-grouping data stored in various fragments of a table. The query processing system 100 may additionally and/or alternatively process the queries without reading or accessing the data stored in each fragment. Instead, the query processing system 100 may generate the partition value identifier and use the partition value identifier to reference value identifiers from each fragment that in turn is associated with values stored in each fragment.

At 502, the query processing system (e.g., via the attribute engine 110) may generate a partition value identifier for a partitioned table (e.g., the partitioned table 200). In some embodiments, the partitioned table includes only a single partition. In other embodiments, the partitioned table includes a plurality of partitions.

The partitioned table may include a plurality of fragments. The plurality of fragments may include a main fragment (e.g., the main fragment 204) and at least one delta fragment (e.g., the delta1 fragment 206 and/or the delta2 fragment 208). The main fragment may include a main dictionary (e.g., the main dictionary 210) storing a plurality of first values and a plurality of main value identifiers corresponding to the plurality of first values. In some embodiments, the main fragment may include a main dictionary storing a first value (e.g., of the plurality of first values) and a main value identifier (e.g., of the plurality of main value identifiers) corresponding to the first value.

The delta fragment may include a delta dictionary (e.g., the first delta dictionary 212 and/or the second delta dictionary 214) storing a plurality of second values and a plurality of delta value identifiers corresponding to the plurality of second values. In some embodiments, the delta fragment may include a delta dictionary storing a second value (e.g., of the plurality of second values) and a delta value identifier (e.g., of the delta value identifiers) corresponding to the second value.

The partition value identifier may be generated by setting the partition value identifier based at least in part on the first value (e.g., the plurality of first values) and the second value (e.g., the plurality of second values). In some embodiments, generating the partition value identifier includes at least one of setting the main value identifier as the partition value identifier based on a determination that the first value is the same as the second value or the first value is stored only in the main fragment, and setting the partition value identifier as a summation of a size of the main dictionary and an additional value based on a determination that the second value is stored only on the delta fragment. This allows for unique partition value identifiers to be generated and used for referencing value identifiers across fragments of a partition of a table. The size of the main dictionary may include a maximum quantity of the main value identifier and/or a number of rows stored in the main dictionary. In some embodiments, the additional value is the delta value identifier corresponding to the second value, such as a numeric value of the delta value identifier.

At 504, the query processing system (e.g., via the attribute engine 110) may maintain a mapping between the generated partition value identifier and a corresponding value identifier. For example, the generated partition value identifier and a corresponding one of the main value identifier and the delta value identifier may be stored in the mapping. The mapping may include a plurality of rows each including at least the generated partition value identifier and corresponding value identifier. In some embodiments, each row includes a single value identifier corresponding to each partition value identifier or a plurality of value identifiers corresponding to each partition value identifier. In some embodiments, the input includes a source of the first value or the second value associated with the corresponding one of the main value identifier and the delta value identifier. In this example, the source may include the corresponding main fragment or delta fragment.

At 506, the query processing system may receive a query including a request to group data stored in the partitioned table across the fragments of the partitioned table. For example, the query processing system may receive a query including a request to group data stored in the partitioned table across the main fragment and the delta fragment. The query may include a query operator, such as a GroupBy query operator that requires data from various fragments to be grouped. In some embodiments, the query includes a GroupBy (PartVID) operator to allow for grouping of data based on the generated partition value identifier.

At 508, the query processing system may execute the query by at least using the mapping. The generated partition value identifier allows for quick and efficient grouping of data stored in the table without needing to first read the data in each fragment and/or later perform a post-processing operation to group the data for efficient query processing. The query processing system may execute the query by grouping the data according to the query operator and query criteria and/or perform another action based on the query criteria. In some embodiments, the query processing system may execute the query operator and send the result of the execution to another system or component of the query processing system for further processing, such as during execution of a query plan.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions which, when executed by the at least one data processor, result in operations comprising: generating a partition value identifier for a partitioned table comprising: a main fragment including a main dictionary storing a first mapping between a first value and a main value identifier corresponding to the first value; and a delta fragment including a delta dictionary storing a second mapping between a second value and a delta value identifier corresponding to the second value, wherein the delta value identifier is different from the main value identifier; wherein generating the partition value identifier comprises: setting the partition value identifier based at least in part on the first value and the second value; maintaining a mapping between the generated partition value identifier and a corresponding one of the main value identifier and the delta value identifier; receiving a query including a request to group data stored in the partitioned table across the main fragment and the delta fragment; and executing the query by at least using the mapping.

Example 2: The system of example 1, wherein the generating the partition value identifier further comprises at least one of setting the main value identifier as the partition value identifier based on a determination that the first value is the same as the second value or the first value is stored only in the main fragment; and setting the partition value identifier as a summation of a size of the main dictionary and an additional value based on a determination that the second value is stored only on the delta fragment.

Example 3: The system of example 2, wherein the additional value is the delta value identifier corresponding to the second value.

Example 4: The system of example 2, wherein the size of the main dictionary is a maximum quantity of the main value identifier stored in the main dictionary.

Example 5: The system of any one of examples 1 to 4, wherein the partitioned table comprises a single partition.

Example 6: The system of any one of examples 1 to 5, wherein the operations further comprise: combining the delta fragment and the main fragment during a delta merge; and resetting, based on the delta merge, the partition value identifier.

Example 7: The system of any one of examples 1 to 6, wherein the query is further executed by at least using a source of the first value or the second value associated with the corresponding one of the main value identifier and the delta value identifier.

Example 8: The system of any one of examples 1 to 7, wherein the source is the corresponding main fragment or delta fragment.

Example 9: A computer-implemented method, comprising: generating a partition value identifier for a partitioned table comprising: a main fragment including a main dictionary storing a first mapping between a first value and a main value identifier corresponding to the first value; and a delta fragment including a delta dictionary storing a second mapping between a second value and a delta value identifier corresponding to the second value, wherein the delta value identifier is different from the main value identifier; wherein generating the partition value identifier comprises: setting the partition value identifier based at least in part on the first value and the second value; maintaining a mapping between the generated partition value identifier and a corresponding one of the main value identifier and the delta value identifier; receiving a query including a request to group data stored in the partitioned table across the main fragment and the delta fragment; and executing the query by at least using the mapping.

Example 10: The method of example 9, wherein the generating the partition value identifier further comprises at least one of setting the main value identifier as the partition value identifier based on a determination that the first value is the same as the second value or the first value is stored only in the main fragment; and setting the partition value identifier as a summation of a size of the main dictionary and an additional value based on a determination that the second value is stored only on the delta fragment.

Example 11: The method of example 10, wherein the additional value is the delta value identifier corresponding to the second value.

Example 12: The method of example 10, wherein the size of the main dictionary is a maximum quantity of the main value identifier stored in the main dictionary.

Example 13: The method of any one of examples 9 to 12, wherein the partitioned table comprises a single partition.

Example 14: The method of any one of examples 9 to 13, further comprising: combining the delta fragment and the main fragment during a delta merge; and resetting, based on the delta merge, the partition value identifier.

Example 15: The method of any one of examples 9 to 14, wherein the query is further executed by at least using a source of the first value or the second value associated with the corresponding one of the main value identifier and the delta value identifier.

Example 16: The method of any one of examples 9 to 15, wherein the source is the corresponding main fragment or delta fragment.

Example 17: A non-transitory computer-readable medium storing instructions, which when executed by at least one data processor, result in operations comprising: generating a partition value identifier for a partitioned table comprising: a main fragment including a main dictionary storing a first mapping between a first value and a main value identifier corresponding to the first value; and a delta fragment including a delta dictionary storing a second mapping between a second value and a delta value identifier corresponding to the second value, wherein the delta value identifier is different from the main value identifier; wherein generating the partition value identifier comprises: setting the partition value identifier based at least in part on the first value and the second value; maintaining a mapping between the generated partition value identifier and a corresponding one of the main value identifier and the delta value identifier; receiving a query including a request to group data stored in the partitioned table across the main fragment and the delta fragment; and executing the query by at least using the mapping.

Example 18: The non-transitory computer-readable medium of example 17, wherein the generating the partition value identifier further comprises at least one of setting the main value identifier as the partition value identifier based on a determination that the first value is the same as the second value or the first value is stored only in the main fragment; and setting the partition value identifier as a summation of a size of the main dictionary and an additional value based on a determination that the second value is stored only on the delta fragment.

Example 19: The non-transitory computer-readable medium of any one of examples 17 to 18, wherein the partitioned table comprises a single partition.

Example 20: The non-transitory computer-readable medium of any one of examples 17 to 19, wherein the operations further comprise: combining the delta fragment and the main fragment during a delta merge; and resetting, based on the delta merge, the partition value identifier.

Figure 6:
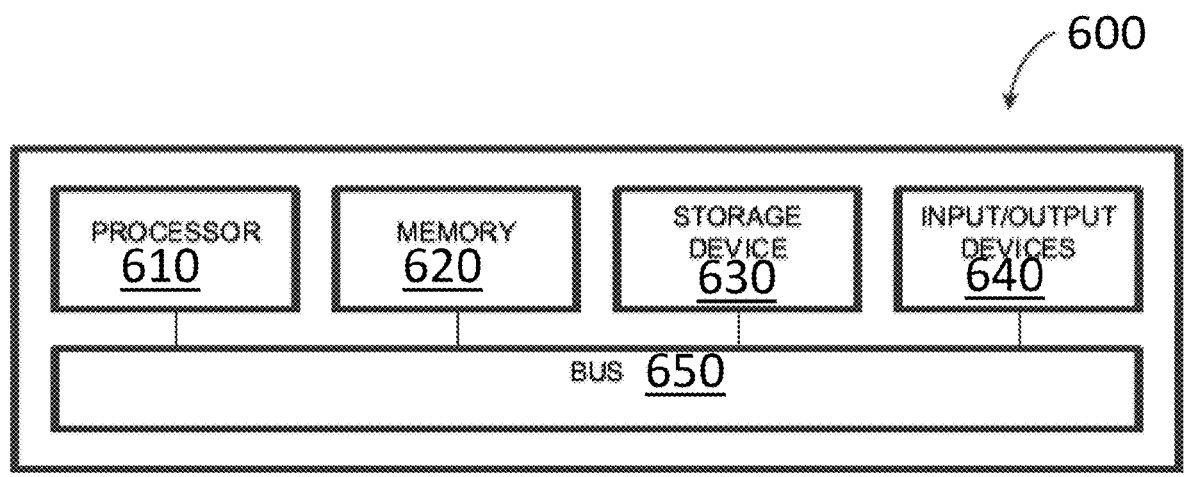
FIG. 6 depicts a block diagram illustrating a computing system, in accordance with some example embodiments.

FIG. 6 depicts a block diagram illustrating a computing system 600 consistent with implementations of the current subject matter. Referring to FIGS. 1 and 6, the computing system 600 can be used to implement the attribute engine 110, the query processing system 100, and/or any components therein.

As shown in FIG. 6, the computing system 600 can include a processor 610, a memory 620, a storage device 630, and indication/output devices 640. The processor 610, the memory 620, the storage device 630, and the indication/output devices 640 can be interconnected via a system bus 650. The processor 610 is capable of processing instructions for execution within the computing system 600. Such executed instructions can implement one or more components of, for example, the attribute engine 110, the query processing system 100, and/or any components therein. In some example embodiments, the processor 610 can be a single-threaded processor. Alternately, the processor 610 can be a multi-threaded processor. The processor 610 is capable of processing instructions stored in the memory 620 and/or on the storage device 630 to display graphical information for a user interface provided via the indication/output device 640.

The memory 620 is a computer readable medium such as volatile or non-volatile that stores information within the computing system 600. The memory 620 can store data structures representing configuration object databases, for example. The storage device 630 is capable of providing persistent storage for the computing system 600. The storage device 630 can be a floppy disk device, a hard disk device, an optical disk device, a tape device, a solid state device, and/or other suitable persistent storage means. The indication/output device 640 provides indication/output operations for the computing system 600. In some example embodiments, the indication/output device 640 includes a keyboard and/or pointing device. In various implementations, the indication/output device 640 includes a display unit for displaying graphical user interfaces.

According to some example embodiments, the indication/output device 640 can provide indication/output operations for a network device. For example, the indication/output device 640 can include Ethernet ports or other networking ports to communicate with one or more wired and/or wireless networks (e.g., a local area network (LAN), a wide area network (WAN), the Internet).

In some example embodiments, the computing system 600 can be used to execute various interactive computer software applications that can be used for organization, analysis and/or storage of data in various formats. Alternatively, the computing system 600 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the indication/output device 640. The user interface can be generated and presented to a user by the computing system 600 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
    at least one data processor; and
    at least one memory storing instructions which, when executed by the at least one data processor, result in operations comprising:
        receiving a query including a request to group data stored in a partitioned table across a main fragment and a delta fragment;
        generating a plurality of partition value identifiers, wherein each partition value identifier of the plurality of partition value identifiers corresponds to a unique data value in the partitioned table;
        grouping the data by the plurality of partition value identifiers;
        era aggregated count of each of the plurality of partition value identifiers based on the grouping;
        mapping each partition value identifier to one or more fragment-local value identifiers corresponding to a respective unique data value; and
        executing the query by at least using a first mapping between a first partition value identifier and a first fragment-local value identifier.

2. The system of claim 1, wherein the first partition value identifier corresponds to a first data value, and wherein generation of the first partition value identifier comprises at least one of:
    setting the first partition value identifier to match the first fragment-local value identifier based on a determination that the first data value is a same value as a second data value of the delta fragment or the first data value is stored only in the main fragment; and setting the first partition value identifier as a summation of a size of a main dictionary and an additional value based on a determination that the second data value is stored only on the delta fragment.

3. The system of claim 1, wherein the operations further comprise: combining the delta fragment and the main fragment during a delta merge; and resetting, based on the delta merge, the plurality of partition value identifiers.

4. The system of claim 2, wherein the additional value is a delta value identifier corresponding to the second data value.

5. The system of claim 2, wherein the size of the main dictionary is a maximum quantity of a main value identifier stored in the main dictionary.

6. The system of claim 2, wherein the query is further executed by at least using a source of the first data value or the second data value associated with the first partition value identifier.

7. The system of claim 6, wherein the source is the corresponding one of the main fragment or the delta fragment.

8. A computer-implemented method, comprising:
    receiving a query including a request to group data stored in a partitioned table across a main fragment and a delta fragment;
    generating a plurality of partition value identifiers, wherein each partition value identifier of the plurality of partition value identifiers corresponds to a unique data value in the partitioned table;
    grouping the data by the plurality of partition value identifiers;
    generating an aggregated count of each of the plurality of partition value identifiers based on the grouping;

mapping each partition value identifier to one or more fragment-local value identifiers corresponding to a respective unique data value; and executing the query by at least using a first mapping between a first partition value identifier and a first fragment-local value identifier.

9. The computer-implemented method of claim 8, wherein the first partition value identifier corresponds to a first data value, and wherein generation of the first partition value identifier comprises at least one of:

setting the first partition value identifier to match the first fragment-local value identifier based on a determination that the first data value is a same value as a second data value of the delta fragment or the first data value is stored only in the main fragment; and setting the first partition value identifier as a summation of a size of a main dictionary and an additional value based on a determination that the second data value is stored only on the delta fragment.

10. The computer-implemented method of claim 8, further comprising: combining the delta fragment and the main fragment during a delta merge; and resetting, based on the delta merge, the plurality of partition value identifiers.

11. The computer-implemented method of claim 9, wherein the additional value is a delta value identifier corresponding to the second data value.

12. The computer-implemented method of claim 9, wherein the size of the main dictionary is a maximum quantity of a main value identifier stored in the main dictionary.

13. The computer-implemented method of claim 9, wherein the query is further executed by at least using a source of the first data value or the second data value associated with the first partition value identifier.

14. The computer-implemented method of claim 13, wherein the source is the corresponding one of the main fragment or the delta fragment.

15. A non-transitory computer-readable medium storing instructions, which when executed by at least one data processor, result in operations comprising:

receiving a query including a request to group data stored in a partitioned table across a main fragment and a delta fragment;

generating a plurality of partition value identifiers, wherein each partition value identifier of the plurality of partition value identifiers corresponds to a unique data value in the partitioned table;

grouping the data by the plurality of partition value identifiers;

generating an aggregated count of each of the plurality of partition value identifiers based on the grouping;

mapping each partition value identifier to one or more fragment-local value identifiers corresponding to a respective unique data value; and executing the query by at least using a first mapping between a first partition value identifier and a first fragment-local value identifier.

16. The non-transitory computer-readable medium of claim 15, wherein the first partition value identifier corresponds to a first data value, and wherein generation of the first partition value identifier comprises at least one of:

setting the first partition value identifier to match the first fragment-local value identifier based on a determination that the first data value is a same value as a second data value of the delta fragment or the first data value is stored only in the main fragment; and setting the first partition value identifier as a summation of a size of a main dictionary and an additional value based on a determination that the second data value is stored only on the delta fragment.

17. The non-transitory computer-readable medium of claim 15, wherein the operations further comprise: combining the delta fragment and the main fragment during a delta merge; and resetting, based on the delta merge, the plurality of partition value identifiers.

* * * * *